United States Patent
Poisner et al.

(10) Patent No.: US 6,795,884 B2
(45) Date of Patent: Sep. 21, 2004

(54) READ-ONLY MEMORY BASED CIRCUITRY FOR SHARING AN INTERRUPT BETWEEN DISK DRIVE INTERFACES

(75) Inventors: David I. Poisner, Folsom, CA (US); Louis A. Lippincott, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 395 days.

(21) Appl. No.: 09/751,272

(22) Filed: Dec. 29, 2000

(65) Prior Publication Data

US 2002/0087772 A1 Jul. 4, 2002

(51) Int. Cl.⁷ ............................................. G06F 13/24
(52) U.S. Cl. .................... 710/260; 710/262; 710/268
(58) Field of Search ..................... 710/48, 260, 268, 710/4, 5, 20, 110, 49, 262, 307; 709/250

(56) References Cited

U.S. PATENT DOCUMENTS

| | | |
|---|---|---|
| 4,631,670 A | 12/1986 | Bradley et al. |
| 4,760,516 A | 7/1988 | Zwick |
| 5,057,997 A | 10/1991 | Chang et al. |
| 5,187,781 A | 2/1993 | Heath |
| 5,475,846 A | 12/1995 | Moore |
| 5,506,997 A | 4/1996 | Maguire et al. |
| 5,535,420 A | 7/1996 | Kardach et al. |
| 5,603,052 A * | 2/1997 | Chejlava, Jr. et al. .......... 710/4 |
| 5,740,450 A | 4/1998 | Chiou et al. |
| 5,745,771 A | 4/1998 | Ohyama et al. |
| 5,802,398 A | 9/1998 | Liu et al. |
| 5,805,929 A | 9/1998 | Connolly et al. |
| 5,828,891 A | 10/1998 | Benayoun et al. |
| 5,911,078 A | 6/1999 | Anderson |
| 5,925,115 A | 7/1999 | Ponte |
| 6,003,109 A | 12/1999 | Caldwell et al. |
| 6,192,425 B1 | 2/2001 | Sato |
| 6,263,395 B1 * | 7/2001 | Ferguson et al. ........... 710/262 |
| 6,279,067 B1 | 8/2001 | Callway et al. |
| 6,286,057 B1 * | 9/2001 | Cornaby et al. ............... 710/5 |
| 6,401,154 B1 | 6/2002 | Chiu et al. |
| 2002/0116563 A1 | 8/2002 | Lever |

FOREIGN PATENT DOCUMENTS

EP    0508602 A2    10/1992

* cited by examiner

*Primary Examiner*—Khanh Dang
(74) *Attorney, Agent, or Firm*—Calvin E. Wells

(57) ABSTRACT

An apparatus for sharing an interrupt between a controller for a parallel storage device interface and a controller for a serial storage device interface includes interrupt conditioning circuitry that masks an interrupt signal coming from the parallel storage device interface if no storage device is coupled to the parallel storage device interface. The masking of the parallel storage device interface interrupt of no storage device is coupled to the parallel storage device interface allows the controller for the serial storage device interface to share the interrupt traditionally assigned to the parallel storage device interface.

12 Claims, 7 Drawing Sheets

US 6,795,884 B2

READ-ONLY MEMORY BASED CIRCUITRY FOR SHARING AN INTERRUPT BETWEEN DISK DRIVE INTERFACES

FIELD OF THE INVENTION

The present invention pertains to the field of computer systems. More particularly, this invention pertains to the field of sharing interrupts between disk drive controllers.

BACKGROUND OF THE INVENTION

Computer systems typically include one or more disk drive devices. These drive devices are coupled to the system via controllers that are typically embedded in the system chipset. Usually, two drive devices can be supported by a single controller. Each of the drives coupled to the controller can signal an interrupt to the controller by causing an interrupt line to become asserted. The two drives coupled to the controller share a single interrupt line. Once an interrupt has been signaled, an interrupt handler routine running on a microprocessor determines which of the drives asserted the interrupt line.

Many computer systems provide two drive controllers that provide support for a total of four drives. One interrupt is provided for each drive controller. Most computer systems set aside two interrupts for hard drive support. The software written for these systems anticipates that only these two interrupts will be assigned to hard drive controllers.

In an effort to improve system performance and to reduce system costs, new drive interface technologies are being developed. It is likely that emerging drive interface technologies will need to co-exist with the current drive controllers described above. A problem exists in that in order for the newer technologies to co-exist with the current drive controllers, either additional interrupts will be required for the drive controllers or a technique for sharing the two available interrupts will be required. In order to support the new technologies and to avoid changing a large established base of software, it is more desirable to provide circuitry for sharing interrupts between the newer and the current drive controllers.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

An apparatus for sharing an interrupt between a controller for a parallel storage device interface and a controller for a serial storage device interface includes interrupt conditioning circuitry that masks an interrupt signal coming from the parallel storage device interface if no storage device is coupled to the parallel storage device interface. The masking of the parallel storage device interface interrupt if no storage device is coupled to the parallel storage device interface allows the controller for the serial storage device interface to share the interrupt traditionally assigned to the parallel storage device interface.

Although the embodiments that follow describe hard disk controllers and interfaces, other embodiments are possible using controllers and interfaces for other types of storage devices, including, but not limited to, optical drives, tape drives, floppy disk drives, etc.

Figure 1:
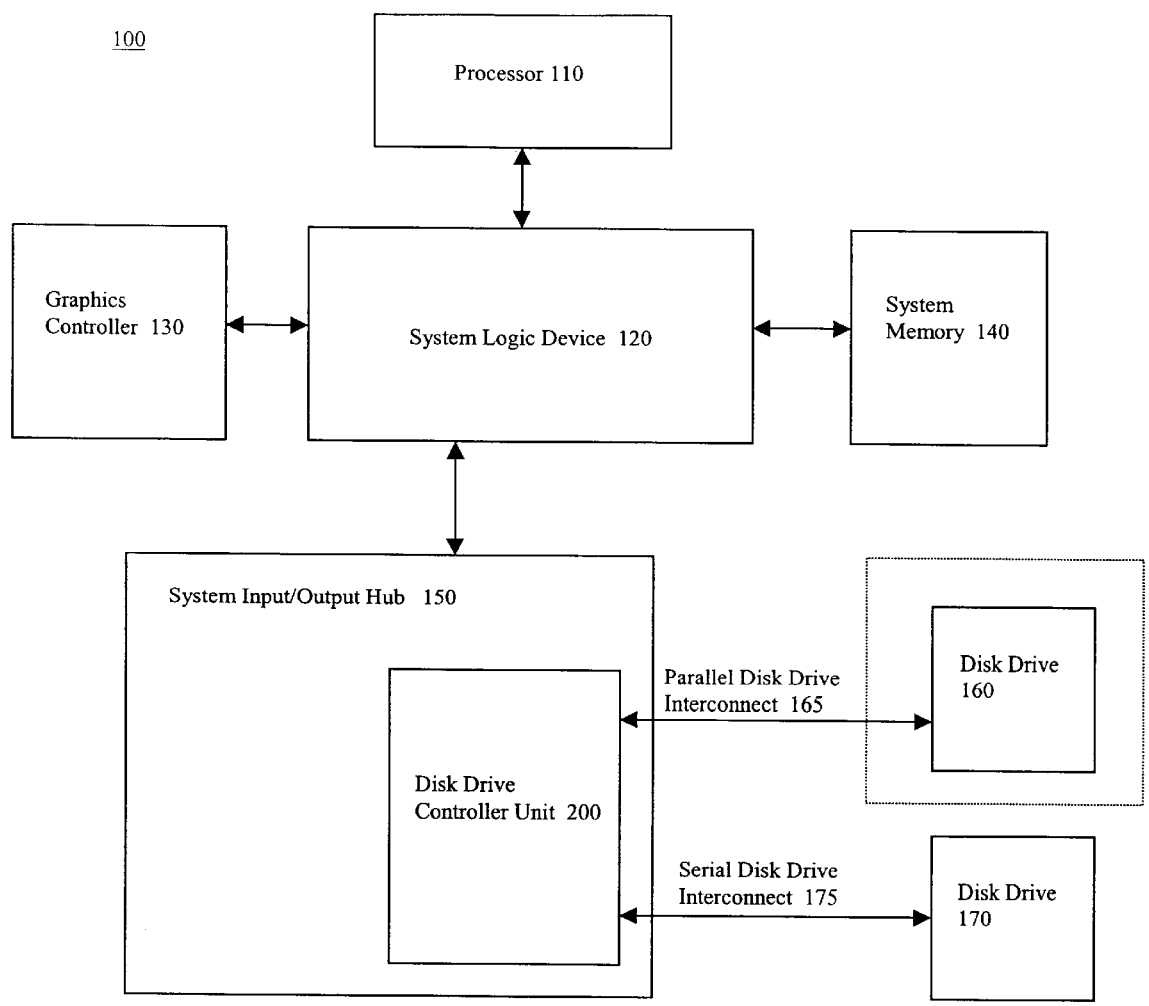
FIG. 1 is a block diagram of a computer system including a disk drive controller unit coupled to both a parallel disk drive interconnect and a serial disk drive interconnect.

FIG. 1 is a block diagram of a system 100 that includes a processor 110 coupled to a system logic device 120. The system logic device 120 is further coupled to a graphics controller 130 and a system memory 140. The system logic device 120 is also coupled to a system input/output hub 150. The system input/output hub 150 includes a drive controller unit 200 that is discussed more fully below in connection with FIG. 2. The drive controller unit 200 is coupled to a disk drive 160 via a parallel disk drive interconnect 165. The disk drive controller unit 200 is also coupled to a disk drive 170 via serial disk drive interconnect 175. The disk drive 160 is optional for this example embodiment.

Figure 2:
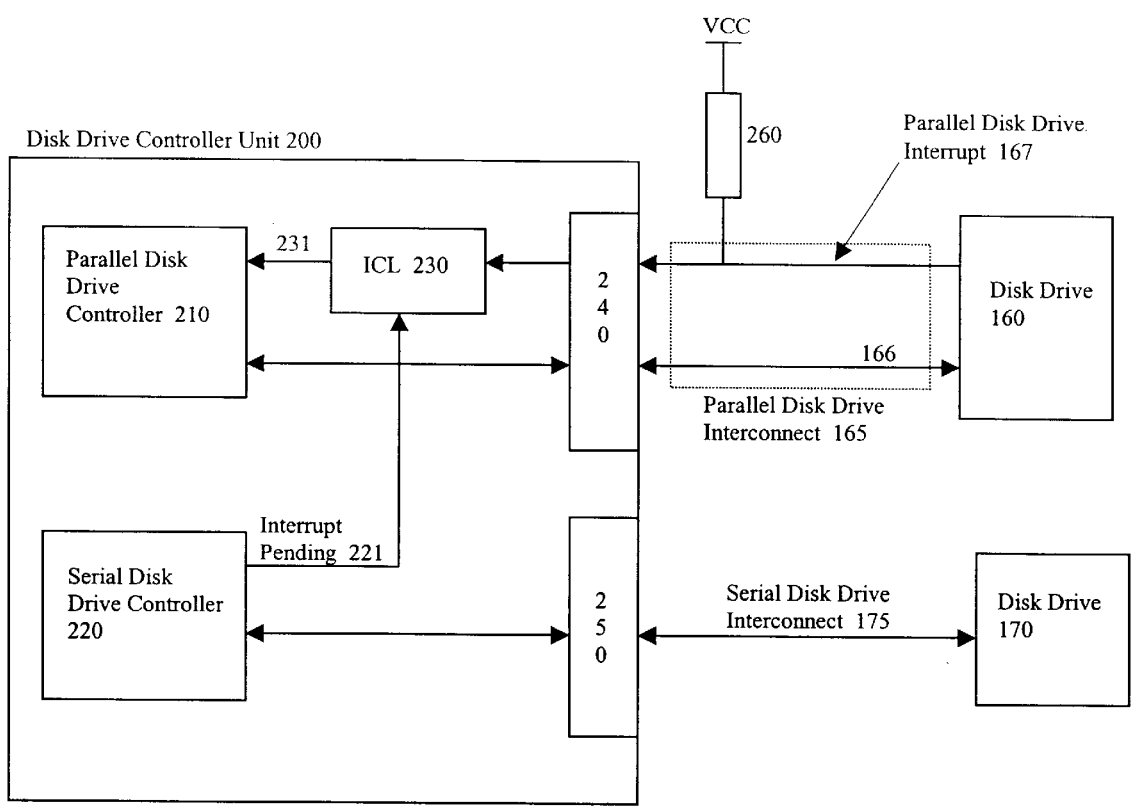
FIG. 2 is a block diagram of one embodiment of a disk drive controller unit including a parallel disk drive controller and a serial disk drive controller.

FIG. 2 is a block diagram including the disk drive controller unit 200. The disk drive control unit 200 includes a parallel disk drive controller 210 and a serial disk drive controller 220. The serial disk drive controller 220 is coupled to the disk drive 170 by way of a the serial disk drive interconnect 175 and a serial disk drive interface 250. The parallel disk drive controller 210 is coupled to the disk drive 160 by way of the parallel disk drive interconnect 165 and a parallel disk drive interface 240. The parallel disk drive interconnect 165 includes multiple address/data/control lines 166 and a parallel disk drive interrupt signal 167. The parallel disk drive interrupt signal 167 is pulled up to a logically high voltage level VCC through a resistor 260 when the disk drive 160 is not driving the parallel disk drive interrupt signal 167 to a logically low voltage level. If disk drive 160 is not installed, then the parallel disk drive interrupt signal 167 is pulled up to VCC.

The disk drive controller unit 200 also includes an interrupt conditioning logic unit (ICL) 230. The ICL 230 receives the parallel disk drive interrupt signal 167 and an interrupt pending signal 221 from the serial disk drive controller 220. In this example embodiment, the serial disk drive interconnect 175 does not have a dedicated interrupt line. Interrupts are communicated from the disk drive 170 to the serial disk drive controller 220 by way of interrupt messages delivered over the serial disk drive interconnect 175. When an interrupt message is received at the serial disk drive controller 220, the serial disk drive controller 220 asserts the interrupt pending signal 221.

The ICL 230 serves to block the parallel disk drive interrupt signal 167 when the disk drive 160 is not installed. If the disk drive 160 is installed, then the parallel disk drive interrupt signal 167 is passed through to the parallel disk drive controller interrupt input 231. The ICL also passes the interrupt pending signal 221 through to the parallel disk drive controller interrupt input 231. By blocking the parallel disk drive interrupt signal 167 when no drive is coupled to the parallel disk drive interface 240, the ICL 230 allows the serial disk drive controller 220 to share the parallel disk drive controller interrupt input 231.

Without the ICL, interrupt sharing would only be possible when both the disk drive 160 and 170 are installed. This is due to the parallel disk drive interrupt signal 167 being pulled to an asserted state when no drive is installed. Typical prior computer systems deal with the asserted disk drive interrupt signal when no drive is installed by masking the interrupt at the system interrupt controller. When more than one disk drive controllers share the interrupt, however, simply masking the interrupt at the system interrupt controller would make sharing impossible.

Figure 3:
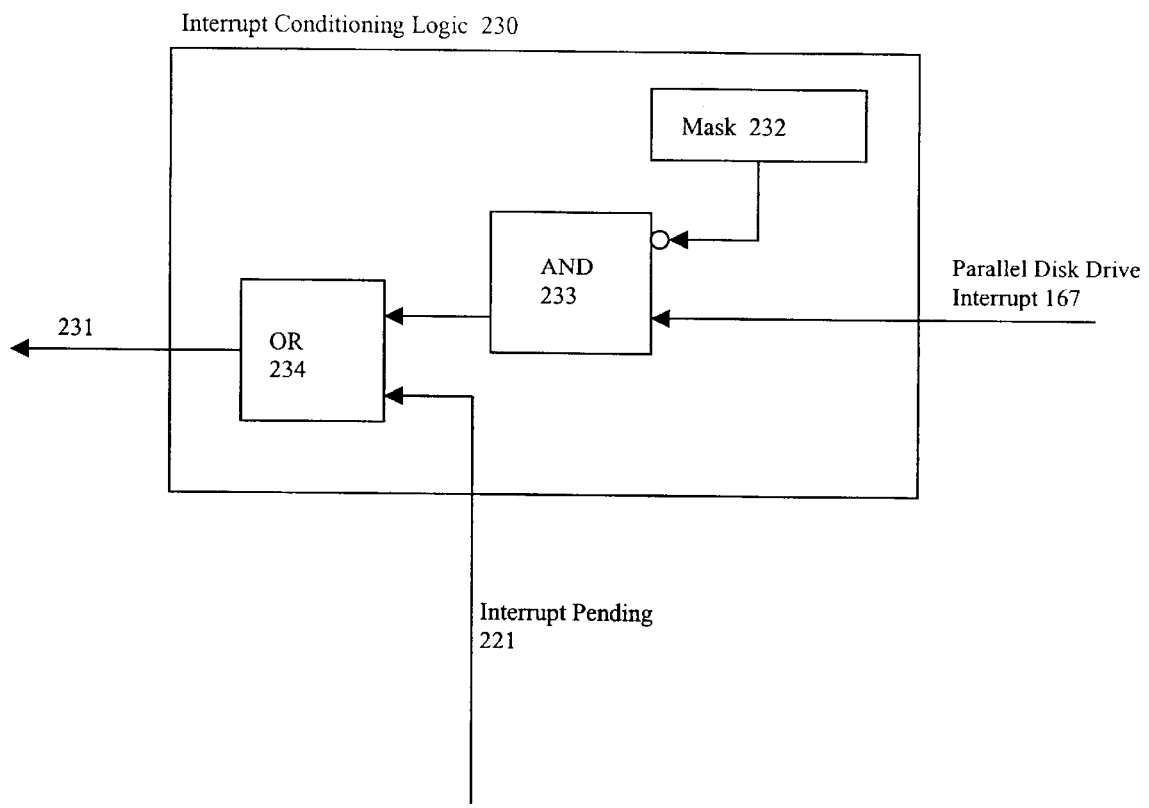
FIG. 3 is a block diagram of one embodiment of an interrupt conditioning logic unit.

FIG. 3 is a block diagram of one embodiment of the ICL 230. The ICL 230 includes an AND gate 233, an OR gate 234, and a mask register 232. When the computer system 100 is first started, the system basic input/output system (BIOS), which is a software agent running on the processor 110, polls the disk drive interfaces to determine which disk drives are installed.

Although the current embodiment describes the BIOS polling the disk drive interfaces to determine which disk drives are installed, other embodiments are possible where a state machine implemented in hardware conducts the polling operations without software intervention.

If no drive is found to be coupled to the parallel disk drive interface 240, then the BIOS writes a "1" to the mask register 232. The value of the mask register is inverted and delivered to one input of the AND gate 233. The other input of the AND gate 233 receives the parallel disk drive interrupt signal 167. When the mask register 232 contains a "1", the output of the AND gate 233 will always show a "0", thereby masking the parallel disk drive interrupt 167. When the mask register 232 contains a "0", then whatever value is delivered to the AND gate 233 by the parallel disk drive interrupt signal 167 is passed through to the OR gate 234. Therefore, the ICL 230 will always pass the interrupt pending signal 221 to the parallel disk drive controller interrupt input 231 and will pass the parallel disk drive interrupt signal 167 to the parallel disk drive controller interrupt input 231 only when the BIOS has detected that a drive is coupled to the parallel disk drive interface 240 and the mask register 232 is not set.

Figure 4:
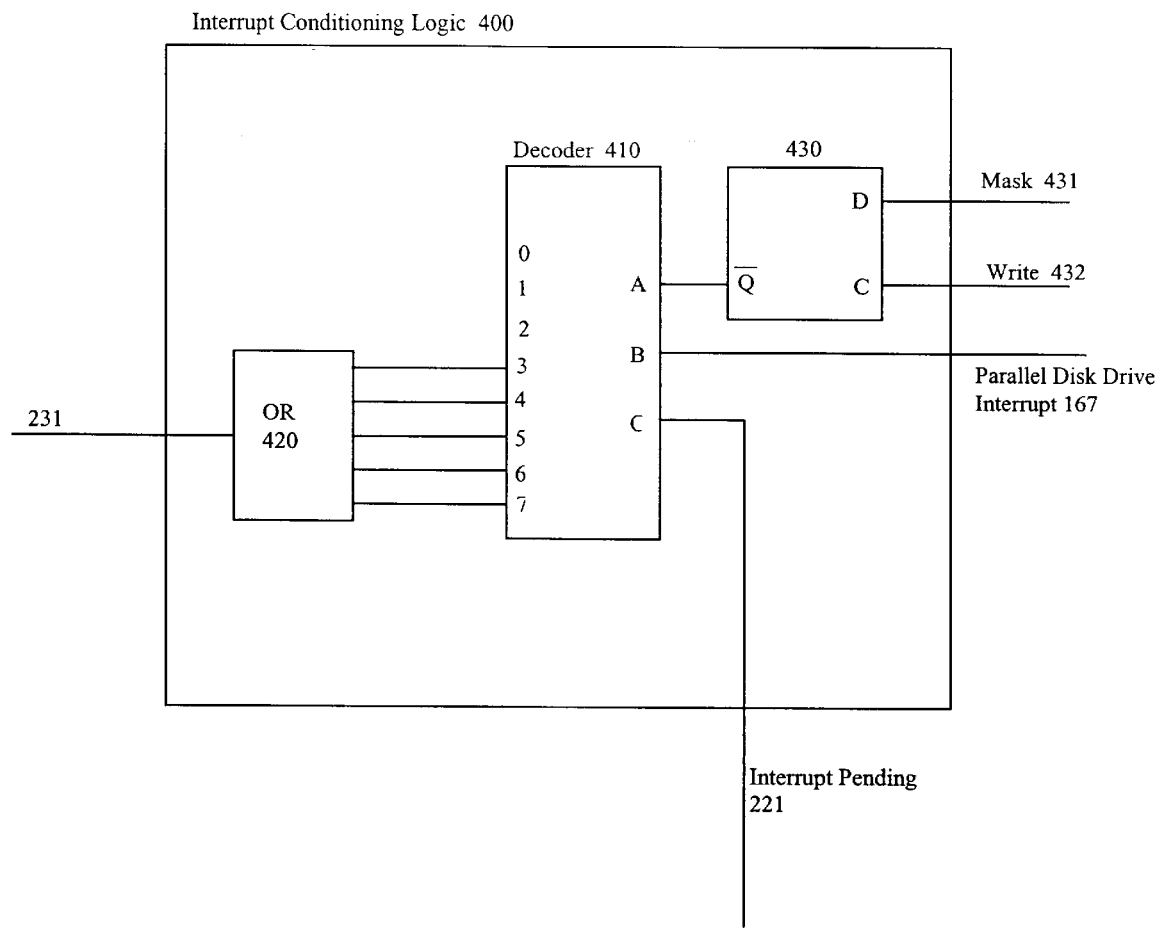
FIG. 4 is a block diagram of an additional embodiment of an interrupt conditioning logic unit.

FIG. 4 is a block diagram of another embodiment of an ICL unit. This example embodiment may be used interchangeably with the embodiment discussed above in connection with FIG. 3. The ICL 400 of FIG. 4 is based around an eight bit decoder 410. The decoder 410 receives at its input C the interrupt pending signal 221 from the serial disk drive controller 220. The B input receives the parallel disk drive interrupt signal 167. The A input receives the inverted output of a flip-flop 430. If the BIOS fails to detect a disk drive coupled to the parallel disk drive interface 240, then a "1" is delivered to the flip-flop 430 via the mask signal 431. The write signal 432 is used to clock in the value delivered over the mask signal 431.

If no drive is detected on the parallel disk drive interface, then the A input of the decoder 410 will receive a "0" from the flip-flop 430. When the A input receives a "0" and the parallel disk drive interrupt 167 is asserted, none of the decoder outputs coupled to the OR gate 420 will become asserted. Therefore, the parallel disk drive interrupt 167 is masked. Whenever the interrupt pending signal 221 is asserted, one of the decoder outputs coupled to the OR gate 420 is guaranteed to become asserted. In this manner, the interrupt pending signal 221 from the serial disk drive controller 220 is always passed through to the parallel disk drive controller interrupt input 231 and the parallel disk drive interrupt 167 is passed on to the parallel disk drive controller interrupt input only if the BIOS has detected the presence of a disk drive on the parallel disk drive interface 240.

Figure 5:
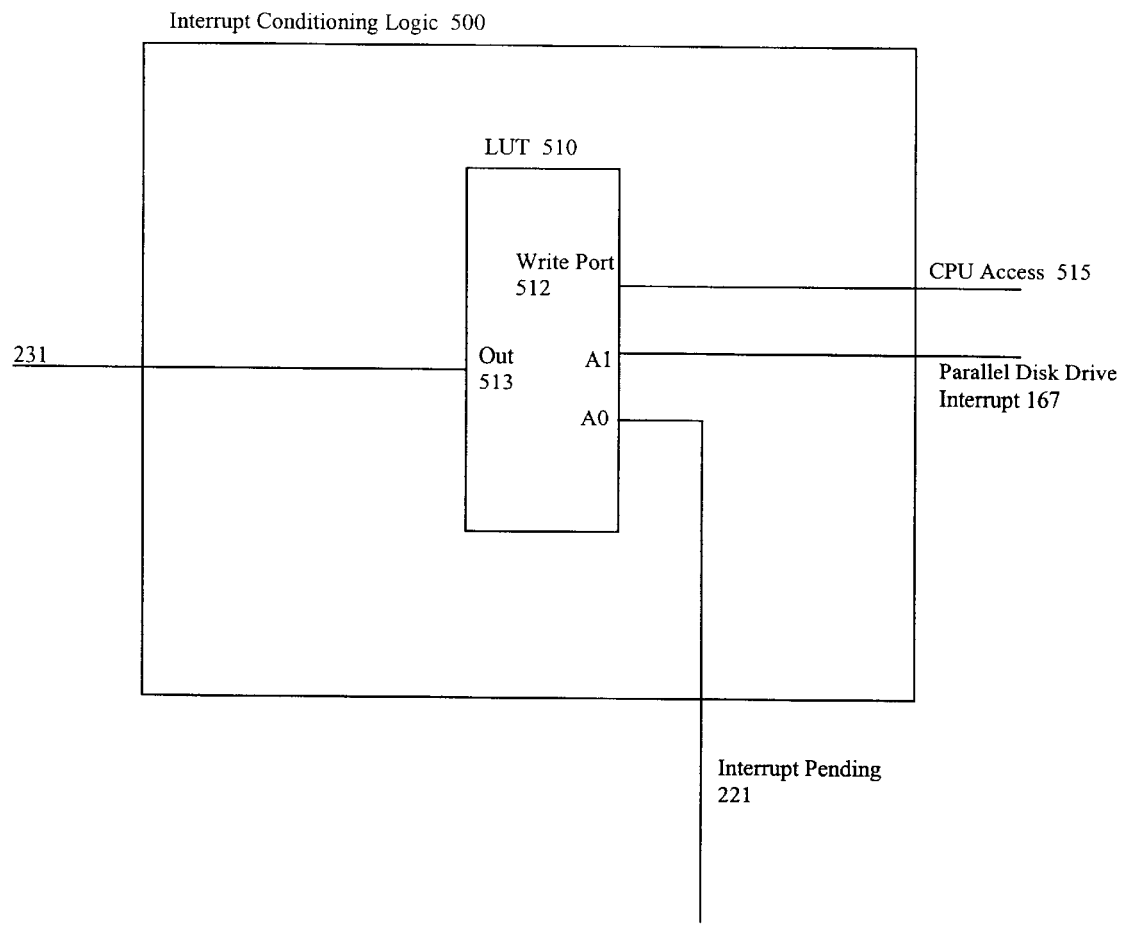
FIG. 5 is a block diagram of another embodiment of an interrupt conditioning logic unit.

FIG. 5 is a block diagram of an additional embodiment of an ICL unit. The ICL 500 of FIG. 5 is based around a dynamic random access memory look-up table (LUT) 510. The LUT 510 includes a write port 512 that is accessible to the processor 110 via a CPU access path 515. The BIOS can cause appropriate values to be written into the LUT 510 where the values are based on whether or not the BIOS has detected a disk drive coupled to the parallel disk drive interface 240. The values stored in the LUT 510 are accessed via the address inputs A1 and A0. The A1 and A0 inputs are coupled to the parallel disk drive interrupt signal 167 and the interrupt pending signal 221, respectively. The value placed onto the output 513 depends on the states of the A1 and A0 inputs. By programming the LUT 510 with appropriate values, the LUT 510 can prevent the parallel disk drive interrupt signal 167 from being passed on to the parallel disk drive controller interrupt input 231 unless a disk drive has been detected on the parallel disk drive interface 240. Further, the LUT 510 will allow the interrupt pending signal 221 to always be passed on to the parallel disk drive controller interrupt input 231.

Figure 6:
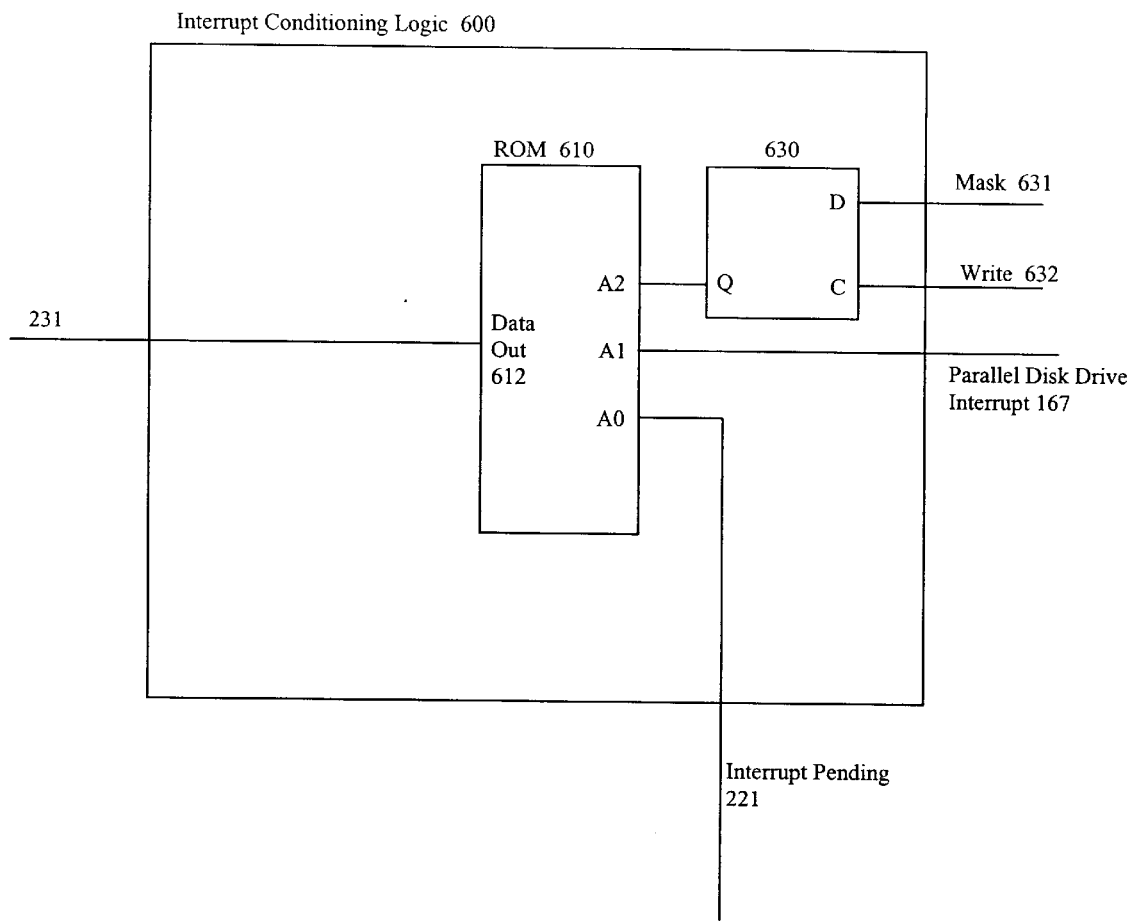
FIG. 6 is a block diagram of a further embodiment of an interrupt conditioning logic unit.

FIG. 6 is a block diagram of a further embodiment of an ICL based on a read-only memory (ROM) 610. The ICL 600 includes the ROM 610 and a flip-flop 630. The ICL 600 of FIG. 6 works in largely the same fashion as the LUT-based embodiment of FIG. 5. However, since the ROM 610 must be programmed prior to system operation and because the BIOS cannot change the values of the ROM 610, the flip-flop 630 is used to manipulate the values presented to the address inputs of the ROM 610 in order to access different storage locations depending on whether or not the BIOS has detected a disk drive coupled to the parallel disk drive interface 240. If no disk drive is detected, then the BIOS delivers a "1" to the mask 631 input to the flip-flop 630. The "1" is clocked into the flip-flop 630 via the write signal 632. The output of the flip-flop 630 is delivered to an address input of the ROM 610 along with the interrupt pending signal 221 and the parallel disk drive interrupt signal 167. The appropriate data is driven from the output 612 of the ROM 610 to the parallel disk drive controller interrupt input 231.

Figure 7:
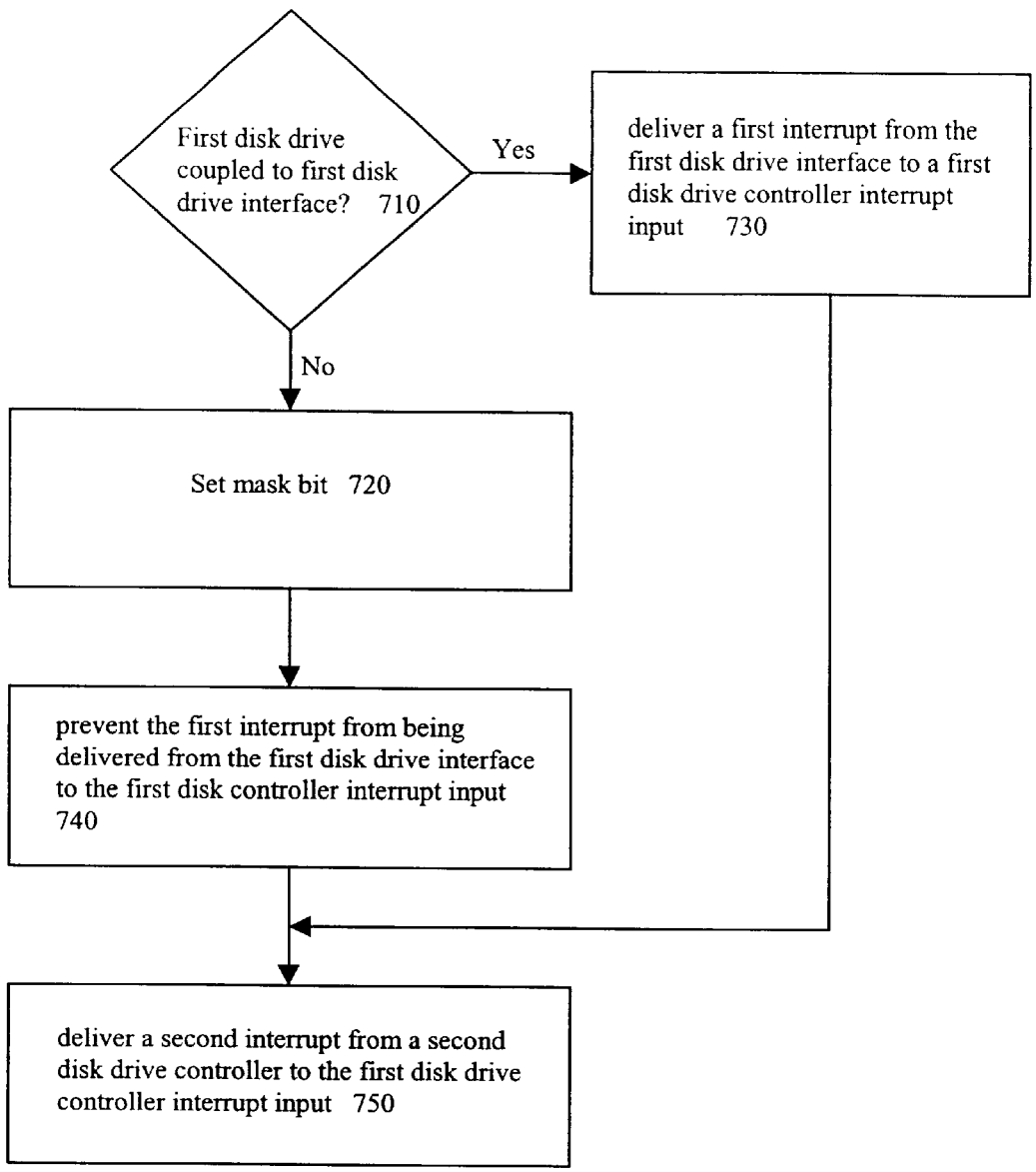
FIG. 7 is a flow diagram of one embodiment of a method for sharing an interrupt between two disk drive controllers.

FIG. 7 is a flow diagram of one embodiment of a method for sharing an interrupt between two disk drive controllers. At block 710, a determination is made as to whether a disk drive is couple to a first disk drive interface. If a disk drive is detected, then at block 730 a first interrupt is delivered from the first disk drive interface to first disk drive controller interrupt input. If a drive is not detected at block 710, then at block 720 a mask bit is set. At block 740 the first interrupt is prevented from being delivered from the first disk drive interface to the first disk controller interrupt input. Lastly, at block 750, a second interrupt is delivered from a second disk drive controller to the first disk drive controller interrupt input.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than in a restrictive sense.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances of "an embodiment," "one embodiment," or "some embodiments" are not necessarily all referring to the same embodiments.

What is claimed is:

1. An apparatus, comprising:
 a first storage device interface;
 a second storage device interface;
 a first controller coupled to the first storage device interface, the first controller including an interrupt signal input;
 a second controller coupled to the second storage device interface; and
 an interrupt conditioning unit including a read-only memory, the read-only memory having a first address input that receives a signal indicating whether a storage device is coupled to the first storage device interface, the read-only memory having a second address input to receive an interrupt signal from the first storage device interface, the read-only memory further having a third address input to receive an interrupt pending signal from the second controller, the interrupt conditioning unit to mask the interrupt signal from the first storage device interface if no storage device is coupled to the first storage device interface, the interrupt conditioning unit further including a flip-flop, the flip-flop including a data input to receive a mask input signal that indicates whether a storage device is coupled to the first storage device interface, the flip-flop further including a clock input to receive a write command signal, the flip-flop to deliver an output to the first read-only memory address input.

2. The apparatus of claim 1, wherein if the flip-flop delivers an output indicating that no storage device is coupled to the first storage device interface, then the read-only memory produces an output indicating that an interrupt is pending only when the interrupt pending signal from the second controller is asserted.

3. The apparatus of claim 2, wherein if the flip-flop delivers an output indicating that a storage device is coupled to the first storage device interface, then the read-only memory produces an output indicating that an interrupt is not pending only when neither the interrupt signal from the first storage device interface nor the interrupt pending signal from the second controller is asserted.

4. The apparatus of claim 1, wherein the first storage device interface is a parallel interface.

5. The apparatus of claim 4, wherein the second storage device interface is a serial interface.

6. The apparatus of claim 5, wherein the second controller asserts the interrupt pending signal in response to an interrupt message being received from the serial interface.

7. A system, comprising:
 a processor; and
 a system logic device coupled to the processor, the system logic device including
  a first storage device interface,
  a second storage device interface coupled to a second storage device,
  a first controller coupled to the first storage device interface, the first controller including an interrupt signal input,
  a second controller coupled to the second storage device interface, and
  an interrupt conditioning unit including a read-only memory, the read-only
memory having a first address input that receives a signal indicating whether a storage device is coupled to the first storage device interface, the read-only memory having a second address input to receive an interrupt signal from the first storage device interface, the read-only memory further having a third address input to receive an interrupt pending signal from the second controller, the interrupt conditioning unit to mask the interrupt signal from the first storage device interface if no storage device is coupled to the first storage device interface, the interrupt conditioning unit further including a flip-flop, the flip-flop including a data input to receive a mask input signal that indicates whether a storage device is coupled to the first storage device interface, the flip-flop further including a clock input to receive a write command signal, the flip-flop to deliver an output to the first read-only memory address input.

8. The system of claim 7, wherein if the flip-flop delivers an output indicating that no storage device is coupled to the first storage device interface, then the read-only memory produces an output indicating that an interrupt is pending only when the interrupt pending signal from the second controller is asserted.

9. The system of claim 8, wherein if the flip-flop delivers an output indicating that a storage device is coupled to the first storage device interface, then the read-only memory produces an output indicating that an interrupt is not pending only when neither the interrupt signal from the first storage device interface nor the interrupt pending signal from the second controller is asserted.

10. The system of claim 7, wherein the first storage device interface is a parallel interface.

11. The system of claim 10, wherein the second storage device interface is a serial interface.

12. The system of claim 11, wherein the second controller asserts the interrupt pending signal in response to an interrupt message being received from the serial interface.

* * * * *